(12) United States Patent
Hatlee

(10) Patent No.: US 6,378,219 B1
(45) Date of Patent: Apr. 30, 2002

(54) CUTTING IMPLEMENT

(76) Inventor: Thomas E. Hatlee, 4863 Gum Rd., Tallahassee, FL (US) 32304

( * ) Notice: Subject to any disclaimer, the term of this patent is extended or adjusted under 35 U.S.C. 154(b) by 0 days.

(21) Appl. No.: 09/626,255

(22) Filed: Jul. 26, 2000

(51) Int. Cl.[7] ............................................. B23D 45/16
(52) U.S. Cl. .............................. 30/391; 30/92; 30/276; 30/286
(58) Field of Search ..................... 30/390, 388, 389, 30/391, 92, 93, 94, 96, 97, 276, 296.1, 319

(56) References Cited

U.S. PATENT DOCUMENTS

| | | | | |
|---|---|---|---|---|
| 1,133,443 A | * | 3/1915 | Martin | 30/390 |
| 1,738,896 A | * | 12/1929 | Hansen | 30/391 |
| 1,780,173 A | * | 11/1930 | Crowe | 30/391 |
| 3,353,266 A | * | 11/1967 | Goolsby | 30/276 |
| 4,437,237 A | * | 3/1984 | Ducret | 30/92 |
| 4,848,001 A | * | 7/1989 | Clark et al. | 30/391 |
| 5,463,942 A | * | 11/1995 | Hupf et al. | 30/276 |

* cited by examiner

*Primary Examiner*—Hwei-Siu Payer
(74) *Attorney, Agent, or Firm*—Peter Loffler

(57) ABSTRACT

A cutting implement for easily cutting into submerged pipes has a housing having a motor disposed therein. A first shaft extends outwardly from the housing in fixed fashion while a second shaft is pivotally connected to the first shaft permitting the second shaft to pivot into various positions with respect to the first shaft. A saw blade is rotatably connected to the second shaft. A transmission mechanism, which can be of any appropriate design, operatively connects the output of the motor to the saw blade for rotating the saw blade. A cover, which is radially rotatable about the second shaft, partially covers the flu saw blade in order to prevent debris from flying up and injuring the operator.

13 Claims, 3 Drawing Sheets

CUTTING IMPLEMENT

BACKGROUND OF THE INVENTION

1. Field of the Invention

The present invention relates to a cutting implement for cutting submerged pipes and the like, the cutting implement minimizing the potential for a worker being sprayed by the contents of the submerged pipe as it is being cut.

2. Background of the Prior Art

Cutting into a submerged pipe in order to perform repair work has always been difficult. The top of the submerged pipe is unearthed and the pipe is cut into from the top using an ordinary pipe saw, after which the desired repairs are performed. The problem with this method is that is causes the contents within the submerged pipe to be sprayed onto worker holding the saw. Not only does this cause an unpleasant and unsanitary condition, it can prove quite dangerous to the worker holding the rotating saw.

Therefore, there is a need in the art for a cutting implement that can cut into a submerged pipe to allow pipe or related repairs, that overcomes the current pipe cutting method problems. Such a cutting implement must allow for cutting into the submerged pipe without the contents of the pipe being sprayed onto the worker performing the pipe cutting procedure. Ideally, the cutting implement will be of relatively simple and straightforward design and will be relatively easy to use and maintain.

SUMMARY OF THE INVENTION

The cutting implement of the present invention addresses the aforementioned needs in the art. The cutting implement allows a worker to cut into a submerged pipe in order to effect a repair while minimizing the potential for the pipe's contents to be sprayed onto the worker or others nearby. This minimization is achieved by allowing the cutting implement to cut the pipe upwardly from the bottom of the pipe instead of downwardly from the top of the pipe. The cutting implement is of relatively simple design and construction and is relatively easy to use and maintain.

The cutting implement of the present invention is comprised of a housing having a motor and a first shaft extending outwardly from the housing. A second shaft is pivotally attached to the first shaft while a saw blade is rotatably attached to the second shaft, the saw blade having an outer periphery. A transmission mechanism is attached to the first shaft and the second shaft and is operably connected to the saw blade and to the motor for rotating the saw blade in response to operation of the motor. A cover is attached to the second shaft and extends beyond a portion of the outer periphery of the saw blade for partially covering the saw blade, the cover being radially rotatable about a point on the second shaft and having a stop, comprised of a cooperating plate with a slot and a prong, attached to the cover and to the second shaft in order to prevent 360 degree rotation of the cover with respect to the second shaft. A stop, comprised of a plate member with a slot and a prong, is also attached to the first shaft and the second shaft for limiting rotation of the second shaft with respect to the first shaft. The second shaft is comprised of a first section and a second section, the first section capable of telescoping with respect to the second section.

BRIEF DESCRIPTION OF THE DRAWINGS

Similar reference numerals refer to similar parts throughout the several views of the drawings.

DESCRIPTION OF THE PREFERRED EMBODIMENT

Figure 1:
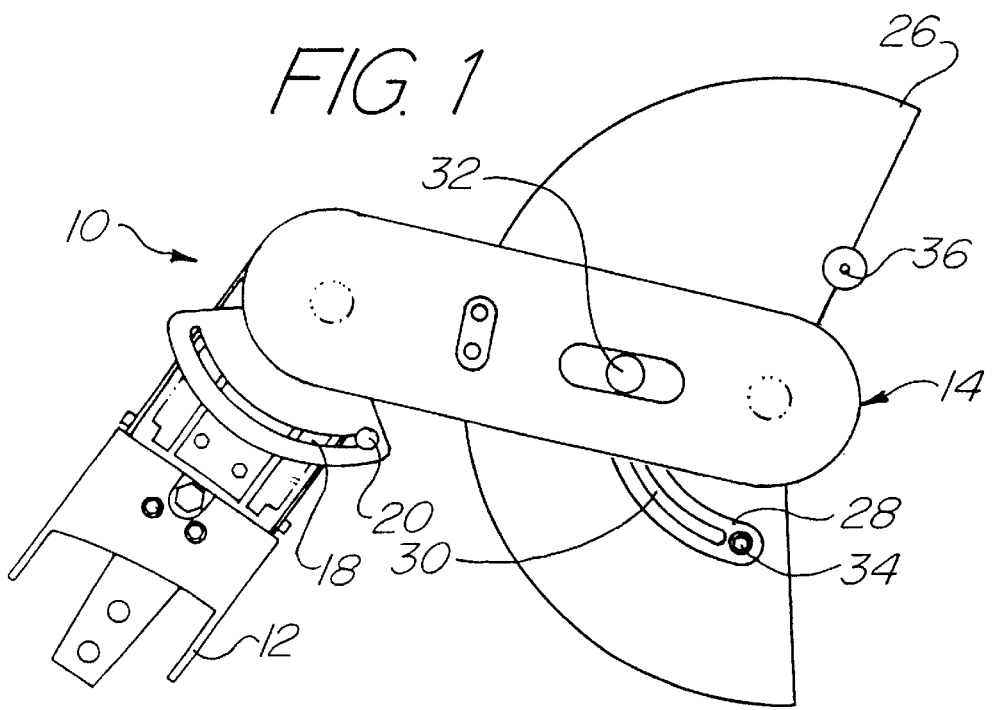
FIGS. 1 and 2 are front elevation views of the cutting implement of the present invention illustrating the various positions through which the cover can articulate.
Figure 2:
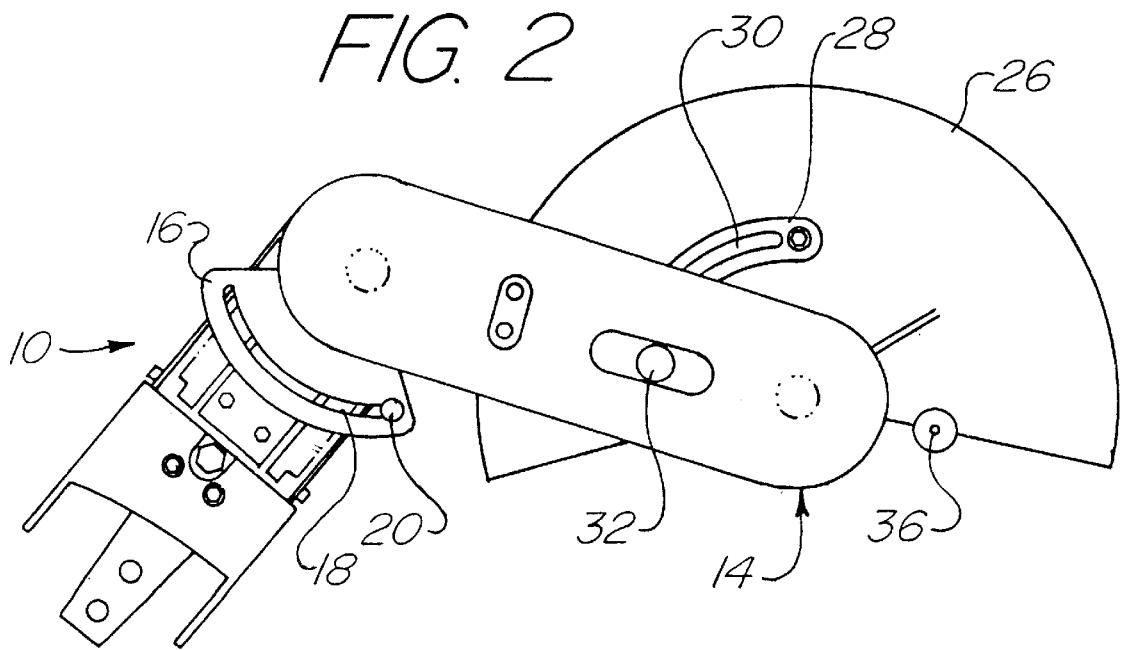
Figure 3:
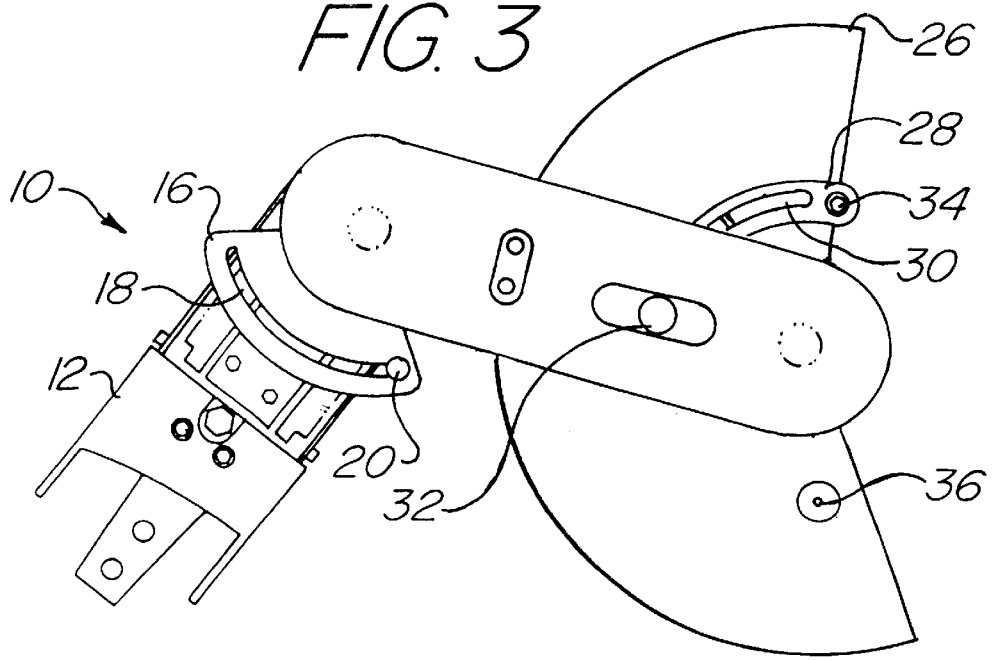
FIGS. 3 and 4 are front elevation views of the cutting implement illustrating the various positions through which the cover can articulate with the second plate member in a position different to the position of the second plate member in FIGS. 1 and 2.
Figure 4:
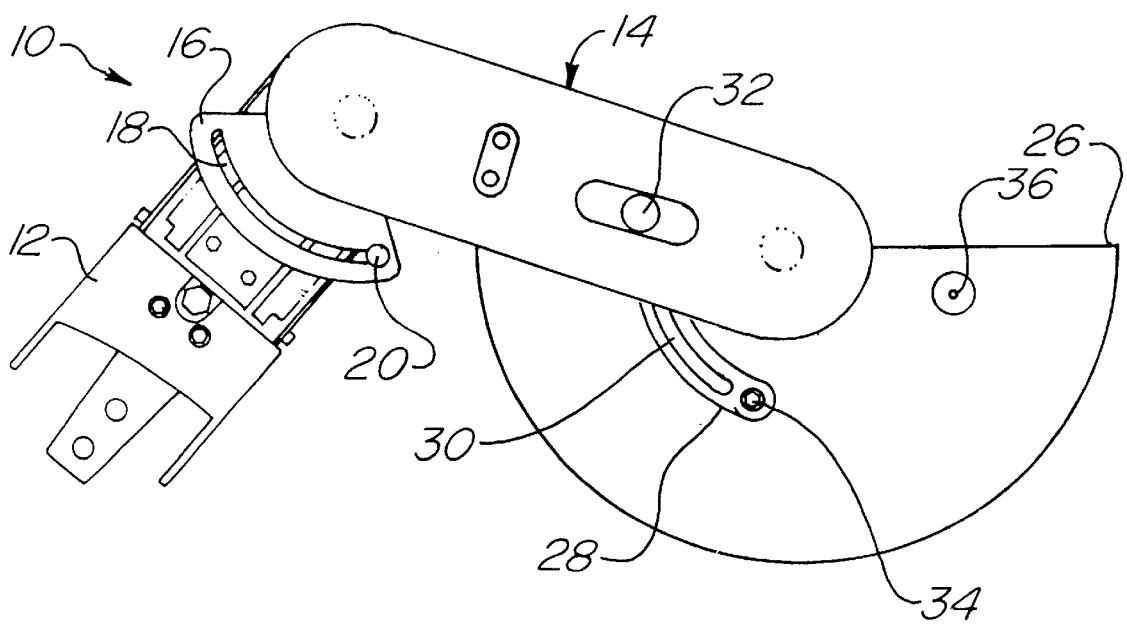

Referring now to the drawings, it is seen that the cutting implement of the present invention, generally denoted by reference numeral 10, is comprised of a housing having a motor (neither illustrated) of any appropriate and conventional design. The housing will have the usual support and control mechanisms (not illustrated) for supporting the motor such as an on/off switch, a fill cap for gas-powered motors, a battery or alternatively a plug for electric motors etc. The housing will also have at least one handle or other appropriate handling means thereon for ease of handling of the cutting implement 10 by a user.

A first shaft 12 is fixedly attached to the housing, while a second shaft 14 is pivotally attached to the first shaft 12. The second shaft 14 can pivot with respect to the first shaft 12. A first plate member 16 is attached to the second shaft 14 and has a slot 18 disposed therein. A first prong 20 is attached to the first shaft 12 and is free to slide within the first slot 18 of the first plate member 16. The first prong 20 limits the pivoting of the second shaft 14 in both radial directions with respect to the first shaft 12. A first cap 22 can be threadably attached to the first prong 20 such that tightening of the first cap 22 will cause the first cap 22 to press against the first plate member 16 and thereby lock the second shaft 14 with respect to the first shaft 12.

A saw blade 24 is rotatably attached to the second shaft 14, and is operatively connected to the motor such that the saw blade 24 rotates in response to operation of the motor. The connection of between the saw blade 24 and the motor (not illustrated) can be of any appropriate design such as a belt and pulley system, a gear system, a chain drive, etc. A cover 26 is attached to the second shaft 14 and overlays the saw blade 24 and extends beyond the outer periphery of the saw blade 24. The cover 26 prevents debris from flying outwardly during saw blade 24 operation, in order to protect the operator of the device 10. The cover 26 can radially rotate with respect to the second shaft 14. A stop, comprised of a second plate member 28 having a second slot 30 attached to the cover 26 and a second prong 32 attached to the second shaft 14 and received within the slot 30 of the second plate member 28 limits the rotation of the cover 26 with respect to the second shaft 14. The second plate member 28 can be placed at any desired location on the cover 26 by passing a bolt 34 through an opening 36 located on the cover 26.

Figure 5:
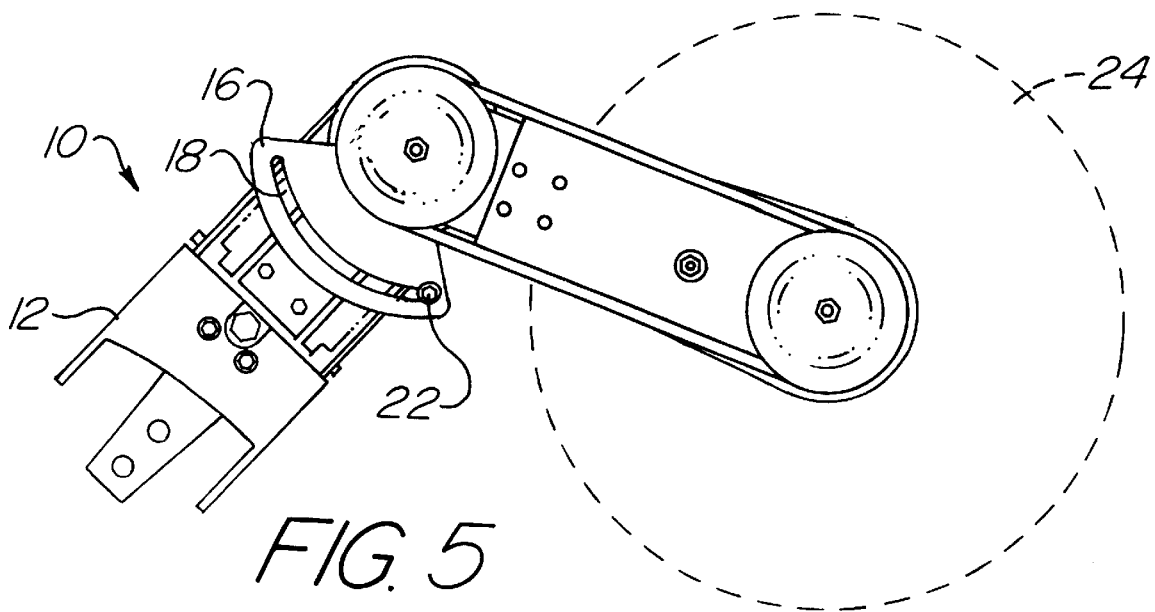
FIG. 5 is a front elevation view of the cutting implement with the cover removed.
Figure 6:
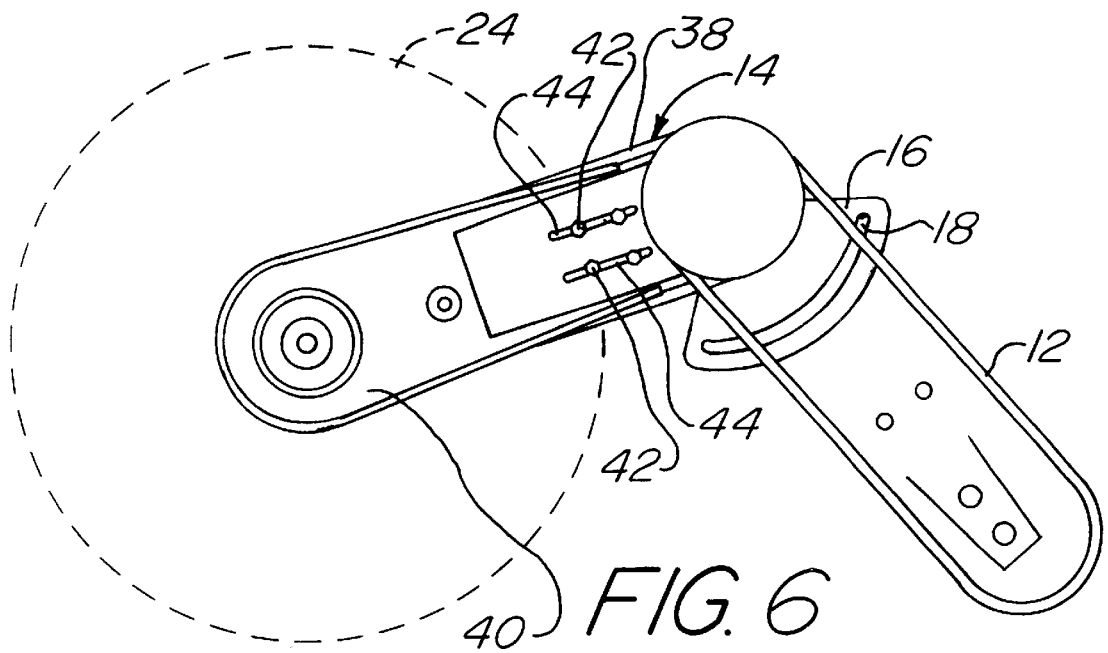
FIG. 6 is a rear elevation view of the cutting implement.

As seen in FIGS. 5 and 6, the second shaft 14 can be comprised of a first section 38 and a second section 40 that can telescope with respect to the first section 38. A third prong 42 is attached to the first section 38 and is received within a third slot 44 located on the second section 40 in order to limit the telescoping extension of the second section 40 with respect to the first section 38. A second cap (not illustrated) can be threadably attached to the third prong 42 such that tightening of the third cap will cause the third cap to press against the second section 40 and thereby lock the first section shaft 38 with respect to the second section 40.

In order to use the cutting implement 10 of the present invention, the pipe to be worked upon is unearthed such that the lower portion of the pipe is exposed. The relative angle between the first shaft 12 and the second shaft 14 is set and the first cap 22 is tightened in order to fix this angle. The motor of the cutting implement 10 is activated in order to begin rotation of the saw blade 24. The saw blade 24 is brought upwardly onto the lower portion of the exposed pipe so that a cut is made into the lower portion (the portion facing into the ground and away from the user) so that any contents within the pipe are sprayed downwardly into the earth.

While the invention has been particularly shown and described with reference to an embodiment thereof, it will be appreciated by those skilled in the art that various changes in form and detail may be made without departing from the spirit and scope of the invention.

I claim:

1. A cutting implement comprising:
   a first shaft;
   a second shaft pivotally attached to the first shaft;
   a saw blade rotatably attached to the second shaft, the saw blade having an outer periphery; and
   a first stop attached to the second shaft for preventing 360 degree rotation of the second shaft with respect to the first shaft.

2. The cutting implement as in claim 1 further comprising a cover attached to the second shaft extending beyond a portion of the outer periphery of the saw blade for partially covering the saw blade.

3. The cutting implement as in claim 2 wherein the cover is radially rotatable about a point on the second shaft.

4. The cutting implement as in claim 3 further comprising a second stop attached to the cover and to the second shaft for preventing 360 degree rotation of the cover with respect to the second shaft.

5. The cutting implement as in claim 4 wherein the stop comprises a plate member having a slot attached to the cover and a prong attached to the second shaft, the prong received within the slot.

6. The cutting implement as in claim 1 wherein the first stop comprises a plate member having a slot attached to the second shaft, and a prong attached to the first shaft, the prong received within the slot.

7. The cutting implement as in claim 1 wherein the second shaft is comprised of a first section and a second section, the first section capable of telescoping with respect to the second section.

8. A cutting implement comprising:
   a first shaft;
   a second shaft pivotally attached to the first shaft;
   a saw blade rotatably attached to the second shaft, the saw blade having an outer periphery; and
   wherein the second shaft is comprised of a first section and a second section, the first section and the second section having means for telescoping the first section with respect to the second section.

9. The cutting implement as in claim 8 further comprising a cover attached to the second shaft extending beyond a portion of the outer periphery or the saw blade for partially covering the saw blade.

10. The cutting implement as in claim 9 wherein the covet is radially rotatable about a point on the second shaft.

11. The cutting implement as in claim 10 further comprising a stop attached to the cover and to the first shaft for preventing 360 degree rotation of the cover with respect to the second shaft.

12. The cutting implement as in claim 11 wherein the stop comprises a plate member having a slot attached to the cover and a prong attached to the second shaft, the prong received within the slot.

13. The cutting implement as in claim 8 further comprising a stop attached to the second shaft for preventing 360 degree rotation of the second shaft with respect to the first shaft wherein the stop comprises a plate member having a slot attached to the second shaft and a prong attached to the first shaft, the prong received within the slot.

* * * * *